United States Patent Office 2,919,269
Patented Dec. 29, 1959

2,919,269

AZO DYESTUFFS AND THEIR COPPER COMPLEX COMPOUNDS

Horst Nickel, Koln-Stammheim, and Fritz Suckfüll, Leverkusen, Germany, assignors to Farbenfabriken Bayer Aktiengesellschaft, Leverkusen, Germany, a corporation of Germany No Drawing. Application July 2, 1957
Serial No. 669,472

Claims priority, application Germany August 16, 1956

11 Claims. (Cl. 260—146)

The present invention relates to new azo dyestuffs, their copper complex compounds and to a process for their manufacture; more particularly it relates to azo dyestuffs corresponding to the following formula

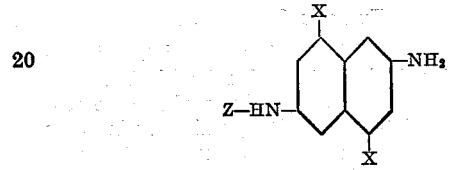

and to the copper complex compounds of these dyestuffs. In the above formula one X stands for a sulfonic acid group and the other X means hydrogen or a sulfonic acid group, R stands for a radical of an azo compound carrying the hydroxyl group in o-position to the azo bridge, and Z denotes the radical of a monofunctional acylating agent, or the radical of a polyfunctional acylating agent which may be linked with a further radical containing amino groups.

In accordance with the invention it has been found that valuable azo dyestuffs and their copper complex compounds are obtainable by combining diazotized aminonaphthalenes of the general formula:

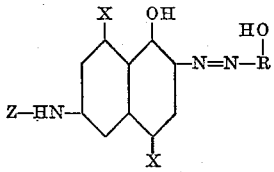

wherein one X means a sulfonic acid group and the other X a hydrogen atom or a sulfonic acid group, and Y stands for a radical convertible into an amino group, with azo components coupling in the o-position to an enolic or phenolic hydroxyl-group, by coppering the azo compounds thus obtained by oxidation, converting the radical Y in these dyestuffs into an amino group, nad reacting the compounds thus obtained with mono- or polyfunctional acylating agents, if desired in admixture with other compounds containing amino groups.

As the radical Y to be converted into an amino group there may be considered for example a nitro group or an acylated amino group.

Instead of coppering the azo dyestuffs first obtained according to the invention by oxidation, the copper complexes may also be obtained by applying the oxidizing coppering at the end of the process to the azo dyestuffs obtained after reacting the azo compounds with acylating agents.

If, in the synthesis of the new dyestuffs, the coppered nitroazo compounds are used as intermediates, the copper may be eliminated in the reduction of the nitro group to the amino group, for example with the use of sodium sulfide, a free hydroxyl group thereby remaining in the 1-position of the naphthalene nucleus of the above mentioned formula. In this case the azo dyestuffs obtained at the end of the process are after-metallized in substance or on the fibre, by the action of copper-yielding agents.

In order to attain a satisfactory substantivity, the monofunctional acylating agents to be used according to the invention must possess a correspondingly high molecular weight. A suitable monofunctional acylating agent for the production of the new dyestuffs is for example 4-benzoylaminobenzoyl chloride.

When using polyfunctional acylating agents it is possible to combine the same or different radicals containing amino groups. Suitable polyfunctional acylating agents are for example phosgene, fumaric acid dichloride, terephthalic acid dichloride or cyanuric chloride.

Another method of producing the new copper-containing azo dyestuffs consists in converting aminonaphthalenes of the general formula:

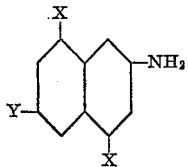

wherein one X denotes a sulfonic acid group and the other X a hydrogen atom or a sulfonic acid group, and Z stands for the radical of a mono-functional acylating agent or a poly-functional acylating agent which may be linked with a further radical containing amino groups, into the diazonium compounds, by combining these with azo components coupling in the o-position to an enolic or phenolic hydroxyl group, and by oxidizing coppering of the azo dyestuffs thus obtained.

In the case where Z denotes the radical of a monofunctional acylating agent, the molecule of the latter must be sufficiently large, to impart a satisfactory substantivity to the dyestuffs. If Z denotes the radical of a polyfunctional acylating agent, the latter may be linked with a further radical containing amino groups. Compounds of this kind are obtainable for example by reacting 2 mols of 2-amino-6-nitronaphthalene-8-sulfonic acid or -4,8-disulfonic acid with poly-functional acylating agents such as phosgene, fumaric acid dichloride, terephthalic acid dichloride or cyanuric chloride, with subsequent reduction of the nitro groups, or by reacting poly-functional acylating agents with 1 mol of 2-amino-6-nitro-naphthalene-8-sulfonic acid or -4,8-disulfonic acid and 1 mol of another amino-group-containing compound which may carry a further diazotizable amino group, with subsequent reduction of the nitro group.

The reaction of the compounds containing aminogroups with mono- or bifunctional acylating agents is effected in usual manner.

The combination of two radicals containing aminogroups in the new dyestuffs via an urea group may also be effected in such a manner that the urethane of one amine is reacted with another component containing amino groups. In this way the same compounds are obtained as may be produced by the reaction of two components containing amino groups with phosgene.

Coupling components containing hydroxy groups which are suitable for the present process are, for example, hydroxybenzenes such as 1-hydroxybenzene-4-sulfonic acid, 1-hydroxy-4-methylbenzene, hydroxynaphthalenes, hydroxynaphthalene-sulfonic acids such as 2-hydroxynaphthalene-3,6-disulfonic acid, 2-hydroxynaphtalene-4-, -5-, -6-, -7- or -8-monosulfonic acid, 2-acetylamino-5-hydroxynaphthalene-1,7-disulfonic acid, 1-ethoxy-8-hydroxynaphthalene-3,6-disulfonic acid, 1-hydroxy-6-(3'-sulfophenyl)-aminonaphthalene-3-sulfonic acid, 1-hydroxynaphthalene-4-sulfonic acid, 2-hydroxynaphthalene- 3,6- or -5,7-disulfonic acid, 1-hydroxynaphthalene-3,8-, -4,7- or -4,8-disulfonic acid, pyrazolones such as 1-(2'-sulfophenyl)-3-phenyl-5-pyrazolone, 1-(4',8'-disulfonaphthyl-[2']-)-3-methyl-5-pyrazolone and 1-phenyl-3-carboxy-5-pyrazolone, hydroxyarylazo compounds such as 1 - hydroxy - 5 - chloro - 3 - sulfonaphthalene -(6,1')- azo- 2'-hydroxynaphthalene-3',6'-disulfonic acid.

The oxidizing coppering of the azo compounds to be used as intermediates according to the invention or of the azo dyestuffs obtainable after the reaction with acylating agents, is carried out for example by the methods disclosed in German patent specifications Nos. 807,289, 889,196 or 893,699.

The new copper-containing dyestuffs are suitable for the dyeing of vegetable fibres such as cotton, or of regenerated cellulose. The dyeings thus obtained have valuable fastness properties.

The following examples are given for the purpose of illustrating the invention without, however, limiting it thereto: the parts by weight and the parts by volume being in the ratio of grams to millilitres.

*Example 1*

(a) 30.4 parts by weight (0.1 mol) of 2-hydroxynaphthalene-3,6-disulfonic acid are dissolved in 300 parts by volume of water, 180 parts by volume of a 20 percent sodium carbonate solution are added, and the mixture is combined at 0-5° C. with a diazonium salt solution prepared in usual manner from 34.8 parts by weight of 2-amino-6-nitro-naphthalene-4,8-disulfonic acid. When the coupling is completed, the monoazo dyestuff is separated by the addition of sodium chloride and isolated.

(b) The dyestuff paste thus obtained is dissolved in 1000 parts by volume of water, rendered weakly acid with acetic acid and treated with 140 parts by volume of a 20 percent sodium acetate solution. After the addition of a solution of 25 parts by weight of crystalline copper sulfate in 140 parts by volume of water, 280 parts by volume of a 3 percent hydrogen peroxide solution are added dropwise with stirring at 50-60° C. within about 3 hours and stirring is continued for about 1 hour. The dyestuff coppered by oxidation is precipitated by the addition of sodium chloride and isolated.

(c) The isolated paste of the copper complex dyestuff is stirred with approximately 850 parts by volume of water, treated with a solution of 48.3 parts by weight of crystalline sodium sulfide, dissolved in 100 parts by volume of water, and maintained for about 15 minutes at 50-55° C. until the reduction of the nitro group of the nitro azo compound is completed. After filtration, the reduction product is separated from the filtrate by acidification and the addition of sodium chloride, and isolated.

(d) This dyestuff paste is dissolved in about 1000 parts by volume of water; phosgene is introduced at 40-50° C. into the solution which is kept soda-alkaline until the formation of the urea group containing dyestuff is completed. The dyestuff is isolated in usual manner and the isolated product is after-treated with a copper salt.

The dry copper complex thus obtained of the dyestuff having the formula

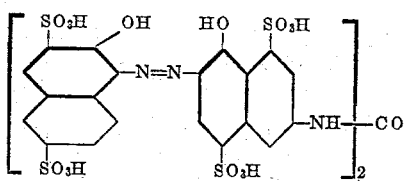

is a dark powder which dissolves in water with a reddish blue coloration. The dyestuff dyes cotton in reddish blue shades of very good fastness to light.

The same dyestuff can be produced by coppering the metal-free dyestuff obtained according to Example 1(c) and subsequently phosgenating the copper complex in weakly acid to alkaline medium. The dyestuff may also be prepared by reducing the nitro group in the monoazo compounds obtained according to Example 1(a) acylating the amino group, coppering the compound by oxidation, saponifying the acylated amino group and phosgenating the copper containing amino monoazo compound thus obtained.

If instead of 2-hydroxynaphthalene-3,6-disulfonic acid there is used in this example the equivalent amount of 1-hydroxynaphthalene-4-sulfonic acid, a dyestuff is obtained which dyes cotton in violet shades.

If 1-phenyl-3-carboxy-5-pyrazolone is used instead of 2-hydroxynaphthalene-3,6-disulfonic acid, a dyestuff is obtained which dyes cotton in reddish violet shades.

If 1-hydroxy-4-methylbenzene is used as a starting coupling component instead of 2-hydroxynaphthalene-3,6-disulfonic acid, a dyestuff is obtained which dyes cotton in brownish violet shades.

When using instead of 2-hydroxynaphthalene-3,6-disulfonic acid the equivalent amount of 2-hydroxynaphthalene-4-sulfonic acid and proceeding in a similar manner to that indicated in this example, a dyestuff is obtained which dyes cotton in reddish blue shades. When using as a coupling component 2-acetylamino-5-hydroxynaphthalene-1,7-disulfonic acid or 1-ethoxy-8-hydroxynaphthalene-3,6-disulfonic acid, dyestuffs are obtained which likewise dye cotton in reddish blue shades. Pyrazolones such as 1-(4',8'-disulfonaphthyl-[2'])-3-methyl-5-pyrazolone or 1-(2'-sulfophenyl)-3-phenyl-5-pyrazolone used as coupling components yield dyestuffs which dye cotton in bluish red shades.

*Example 2*

The copper complex of the dyestuff having the formula

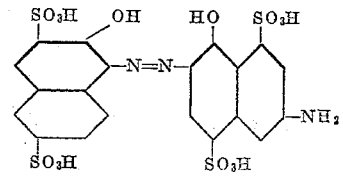

obtainable by coupling, according to the instructions of Example 1, 30.4 parts by weight of 2-hydroxynaphthalene-3,6-disulfonic acid with the diazo compound from 34.8 parts by weight of 2-amino-6-nitronaphthalene-4,8-disulfonic acid, subsequent treatment with copper salt and hydrogen peroxide, and reduction with sodium sulfide, is dissolved in about 1500 parts by volume of water and treated with stirring in a soda-alkaline medium at 0-5° C. with fumaric acid dichloride dissolved in twice of the volume of acetone until the reaction is completed.

After isolation and after-treatment with copper salt, the dry dyestuff obtained is a dark powder. The dyestuff dissolves in water with a violet coloration and dyes cotton in bluish violet shades.

If in this example instead of fumaric acid dichloride there is used terephthalic acid dichloride, working otherwise as indicated above, a dyestuff is obtained which likewise dissolves in water with a violet coloration and dyes cotton in violet blue shades.

*Example 3*

36.1 parts by weight (0.05 mol) of the urea group containing compound having the formula

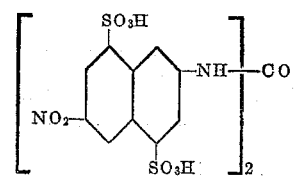

are stirred into 500 parts by volume of water and reduced at about 50° C. with 70 parts by weight of iron powder and about 40 parts by volume of acetic acid. The solution of the reduced dyestuff is rendered alkaline with soda, filtered, and the amino compound is isolated from the filtrate in a medium acid to Congo.

The diamino urea compound is tetrazotized in usual manner and coupled at 0–5° C. in a soda-alkaline medium with 30.4 parts by weight of 2-hydroxynaphthalene-3,6-disulfonic acid dissolved in 300 parts by volume of water. When the coupling is completed the product is salted out with sodium chloride and isolated.

The dyestuff paste thus obtained is stirred into 1800 parts by volume of water, rendered acidic with acetic acid and treated with 140 parts by volume of a 20 percent sodium acetate solution. After the addition of a solution of 25 parts by weight of crystalline copper sulfate, the mixture is dissolved by heating, and 350 parts by volume of a 3 percent hydrogen peroxide solution are added dropwise with stirring at 60° C. within about 3 hours. The copper-containing dyestuff is separated by adding sodium chloride and isolated. The dry dyestuff is a dark powder which dissolves in water with a violet coloration and dyes cotton in reddish blue shades.

*Example 4*

30.4 parts by weight of 1-hydroxynaphthalene-3,6-disulfonic acid dissolved in 300 parts by volume of water are treated with 160 parts by volume of a 20 percent sodium carbonate solution and combined at 0–5° C. with the diazonium salt solution from 26.8 parts by weight of 2-amino-6-nitronaphthalene-8-sulfonic acid. When the coupling is completed, the solution is rendered acidic with acetic acid, 140 parts by volume of a sodium acetate solution are added, and, after the addition of a solution of 25 parts by weight of crystalline copper sulfate in 140 parts by volume of water, there are added dropwise with stirring at about 60° C. 300 parts by volume of 3 percent hydrogen peroxide solution within about 3 hours. When the reaction is completed, the solution is concentrated to half its volume, treated with a solution of 48.3 parts by weight of crystalline sodium sulfide in 100 parts by volume of water, and kept at 50–55° C. for about 15 minutes, until the reduction of the nitro group is completed. The product is filtered, the filtrate rendered acid to Congo, and the dyestuff having the formula

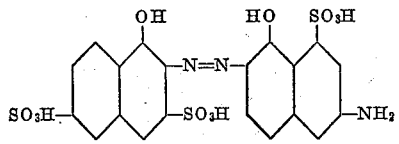

is separated by the addition of sodium chloride and isolated.

The isolated dyestuff paste is phosgenated in a soda-alkaline medium at about 50° C. and the isolated urea containing dyestuff is aftertreated with copper salt in usual manner. The dry copper-containing dyestuff is a dark powder which dissolves in water with a blue coloration and dyes cotton in bluish grey shades.

*Example 5*

A solution of the sodium salt of 22.4 parts by weight (0.1 mol) of 2-hydroxynaphthalene-4-sulfonic acid in 200 parts by volume of water is combined with 120 parts by volume of a 20 percent sodium carbonate solution, and at 0–5° C., with a diazonium salt solution prepared in usual manner from 34.8 parts by weight of 2-amino-6-nitronaphthalene-4,8-disulfonic acid. When the coupling is completed, the monoazo dyestuff is separated by adding sodium chloride and isolated.

The dyestuff paste thus obtained is stirred into 1700 parts by volume of water, the nitro group is reduced at 50° C. with a solution of 42 parts by weight of crystalline sodium sulfide in 100 parts by volume of water, and the dyestuff is isolated in usual manner.

The aminoazo dyestuff is dissolved with the addition of soda in about 1200 parts by volume of water; phosgene is introduced into the solution at 50° C., until the formation of the urea is completed. The dyestuff is isolated by filtration, the dyestuff paste is then dissolved in 2000 parts by volume of water, 140 parts by volume of a 20 percent sodium acetate solution and the solution of 25 parts by weight of crystalline copper sulfate, and maintained at 70° C. for 15 minutes. About 280 parts by volume of 3 percent hydrogen peroxide solution are then added dropwise within approximately 60 minutes, until the oxidizing coppering is completed. The dyestuff is salted out with sodium chloride and isolated.

The dry copper complex thus obtained of the dyestuff having the formula

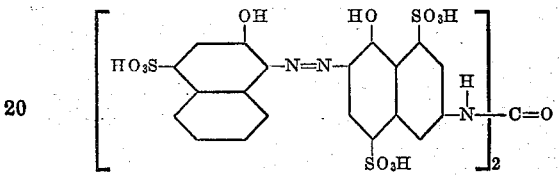

is a dark powder which dissolves in water with a blue coloration. The dyestuff dyes cotton in reddish blue shades and corresponds to the dyestuff obtained according the Example 1.

When using instead of 2-hydroxynaphthalene-4-sulfonic acid the equivalent amount of the following coupling components and otherwise proceeding in an analogous manner, substantive dyestuffs are also obtained which dye cotton in the following shades:

2-hydroxynaphthalene-3,6-disulfonic acid__ Reddish blue.
2-hydroxynaphthalene-5,7-disulfonic acid__ Violet.
1-hydroxynaphthalene-4,7-disulfonic acid__ Violet.
1-hydroxynaphthalene-4,8-disulfonic acid__ Bluish violet.
1-hydroxy-6-(3'-sulfophenyl)-aminonaphthalene-3-sulfonic acid_____ Reddish blue.
1-hydroxybenzene-4-sulfonic acid_____ Bluish red.

The dyestuff obtained with the last coupling component has the following formula:

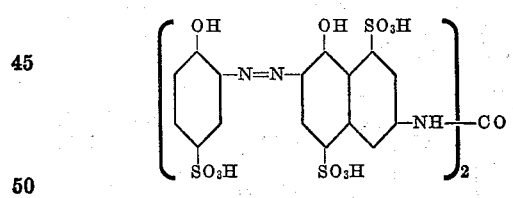

*Example 6*

9.2 parts by weight (0.05 mol) of cyanuric chloride are dissolved in 70 parts by volume of acetone and poured into a mixture of 300 parts by volume of water and 50 parts by weight of ice, the cyanuric chloride thereby precipitating out. To the precipitate there are added 50 parts by volume of a 20 percent sodium acetate solution and a solution of the aminomonoazo dyestuff of the formula

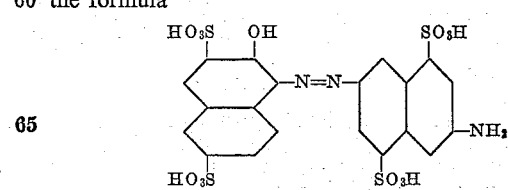

obtainable according to the instruction given in Example 5, from 30.4 parts by weight (0.1 mol) of 2-hydroxynaphthalene- 3,6-disulfonic acid and the diazo compound of 34.8 parts by weight of 2-amino-6-nitronaphthalene-4,8-disulfonic acid. The mixture is stirred first at room temperature, then at 40–45° C. until the condensation is completed. The dyestuff thus formed is salted out with sodium chloride and isolated. It has the following structural formula:

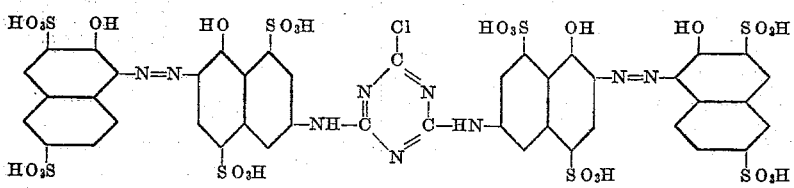

The dyestuff paste is stirred into 2300 parts by volume of water, treated with 140 parts by volume of a 20 percent sodium acetate solution and a solution of 25 parts by weight of crystalline copper sulfate in 150 parts by volume of water, and maintained at 75° C. for 15 minutes. At 60° C. and a pH value of about 5.5, 300 parts by volume of a 3 percent hydrogen peroxide solution are added dropwise to the solution within 2 hours, until the oxidizing coppering is completed. The dyestuff is salted out with sodium chloride and isolated. The dry copper-containing dyestuff is a dark powder which dissolves in water with a violet coloration and dyes cotton in violet shades.

Example 7

A solution of the sodium salt of 58.9 parts by weight (0.1 mol) of the monoazo dyestuff having the formula

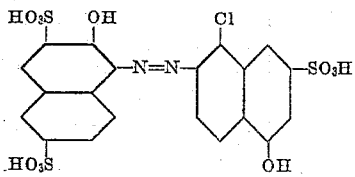

obtainable, for example, by coupling of the diazotized O-benzene-sulfonyl compound of 1-chloro-2-amino-5-hydroxynaphthalene-7-sulfonic acid with 2-hydroxynaphthalene-3,6-disulfonic acid and subsequent alkaline saponification, in 600 parts by volume of water is combined in a soda-alkaline medium at 0–5° C. with the diazonium compound prepared in usual manner from 34.8 parts by weight of 2-amino-6-nitronaphthalene-4,8-disulfonic acid. When the coupling is completed, the disazo dyestuff thus formed of the formula

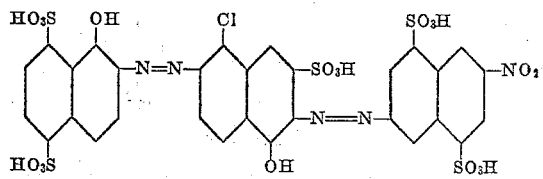

is separated with sodium chloride and isolated. The dyestuff paste thus obtained is stirred into 1450 parts by volume of water, rendered weakly acid with acetic acid (pH 5.5) and dissolved with heating with 140 parts by volume of a 30 percent sodium acetate solution and a solution of 30 parts by weight of crystalline copper sulfate in 200 parts by volume of water. At 55–60° C. and a pH value of 5.5, about 350 parts by volume of a 3 percent hydrogen peroxide solution are added dropwise, until the reaction is completed. The disazo dyestuff coppered by oxidation is separated by the addition of sodium chloride and isolated. The isolated dyestuff paste is stirred into 700 parts by volume of water and treated at 55° C. with a solution of 48 parts by weight of crystalline sodium sulfide, until the reduction of the nitro group is completed. After filtration, the reduction product is isolated from the filtrate.

The dyestuff paste thus obtained is treated with copper salts by usual methods, the solution of the coppered dyestuff is buffered with sodium acetate and then reacted at 0° C. with terephthalic acid dichloride. When the reaction is completed, the dyestuff is separated by adding sodium chloride and isolated. The dry dyestuff is a dark powder which dyes cotton in grey shades.

When using as acylating agent instead of terephthalic acid dichloride phosgene a dyestuff is obtained which likewise dyes cotton in grey shades.

Example 8

The aminomonoazo dyestuff of the formula

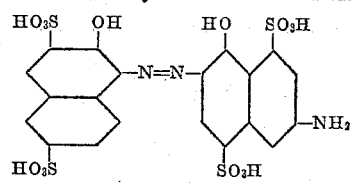

obtainable according to the instructions given in Example 1 from 30.4 parts by weight (0.1 mol) of 2-hydroxynaphthalene-3,6-disulfonic acid and the diazo salt of 34.8 parts by weight of 2-amino-6-nitronaphthalene-4,8-disulfonic acid, is dissolved in 1000 parts by volume of water; about 25 parts by weight of 4-nitrobenzoyl chloride are introduced in portions with vigorous stirring at 50° C. into the weakly soda-alkaline solution until the nitrobenzoylation is completed. The reaction product is isolated in usual manner, stirred with 1200 parts by volume of water, the nitro group reduced at 50° C. with a solution of 42 parts by weight of crystalline sodium sulfide, worked up in usual manner and isolated. The paste of the compound thus obtained is dissolved weakly alkaline in 1400 parts by volume of water and treated dropwise with vigorous stirring at 50° C. with about 15 parts by volume of benzoyl chloride, until the benzoylation is completed. The dyestuff is salted out with sodium chloride, isolated and after-treated with copper-salts by usual methods. The dry copper complex of the dyestuff having the formula

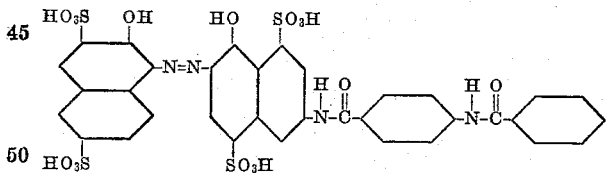

is a dark powder which dissolves in water with a violet coloration and dyes cotton in violet shades.

When phosgenating the reduced nitro-benzoyl product of the formula

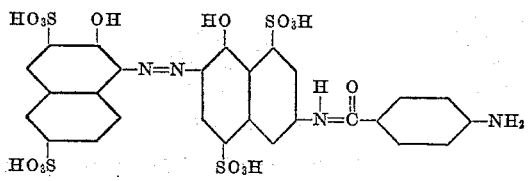

and coppering the urea thus formed by usual methods, a substantive dyestuff is likewise obtained which dyes cotton in violet shades.

When treating the nitrobenzoyl compound of the formula

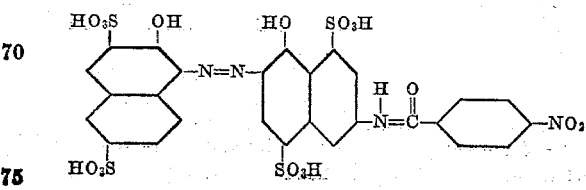

with glucose under reducing alkaline conditions and after-coppering by usual methods, a dyestuff is obtained, the copper complex of which dyes cotton in violet shades.

*Example 9*

Into a solution of 0.05 mol of the aminoazo dyestuff of the formula

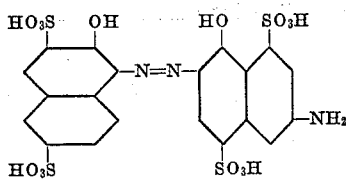

obtainable according to the instructions given in Example 1 from 15.2 parts by weight of 2-hydroxynaphthalene-3,6-disulfonic acid and the diazo compound of 17.4 parts by weight of 2-amino-6-nitronaphthalene-4,8-disulfonic acid, and of 0.05 mol of the aminoazo dyestuff having the formula

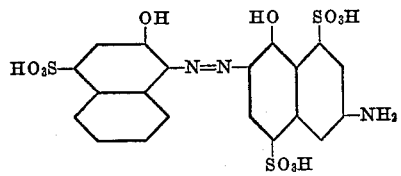

obtainable according to the instructions given in Example 1 from 11.2 parts by weight of 2-hydroxynaphthalene-4-sulfonic acid and 17.4 parts by weight of 2-amino-6-nitronaphthalene-4,8-disulfonic acid, in 1500 parts by volume of water having a soda-alkaline reaction, phosgene is introduced at about 50° C. until the formation of urea is completed. The dyestuff thus formed is separated with sodium chloride, isolated and after-treated with copper salts by usual methods.

The dry copper complex dyestuff is a dark powder which dissolves in water with a blue coloration and dyes cotton in reddish blue shades.

*Example 10*

100 parts by weight of cotton are introduced at room temperature into a dye bath containing 4000 parts by volume of water, 2 parts by weight of the dyestuff described in Example 1 (prepared by using 2-hydroxynaphthalene-3,6-disulfonic acid as coupling component), 1 part by weight of sodium carbonate and 20 parts by weight of sodium sulfate. The dye-bath is heated within 30 minutes up to 90° C. and maintained at 90–95° C. for 30 minutes. After rinsing with water and drying a reddish-blue dyeing of very good fastness to light is obtained.

We claim:

1. A dyestuff selected from the group consisting of azo dyestuffs corresponding to the formula

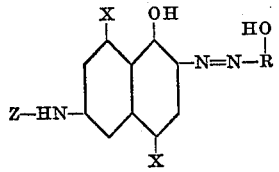

wherein one X means a sulfonic acid group and the other X stands for a radical selected from the group consisting of hydrogen and a sulfonic acid group, R means a radical of a coupling component selected from the group consisting of benzene, naphthalene and pyrazolone series, bearing the hydroxyl group in o-position to the azo bridge and Z stands for a number selected from the group consisting of (1) a radical of a monocarboxyl compound of the benzene series and (2) —CO—, —OC—CH=CH—CO—, a terephthaloyl and a cyanuric chloride radical, the free valence of the class (2) radicals being linked with a second amino group-containing monoazo dyestuff, corresponding to that portion of the above formula bonded to Z, and the copper complex compound of this azo dyestuff.

2. A dyestuff of claim 1 wherein Z is —CO—.

3. A dyestuff of claim 1 wherein Z is —OC—CH=CH—CO—.

4. A dyestuff of claim 1 wherein Z is a terephthaloyl radical.

5. A dyestuff of claim 1 wherein Z is a cyanuric chloride radical.

6. A dyestuff selected from the group consisting of azo dyestuffs corresponding to the formula

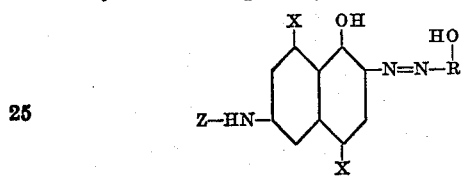

wherein one X means a sulfonic acid group and the other X stands for a radical selected from the group consisting of hydrogen and a sulfonic acid group, R means a radical of a coupling component selected from the group consisting of benzene, naphthalene and pyrazolone series, bearing the hydroxyl group in o-position to the azo bridge and Z stands for a radical of a monocarboxyl compound of the benzene series, and the copper complex compound of this azo dyestuff.

7. The copper complex of the azo dyestuff corresponding to the formula

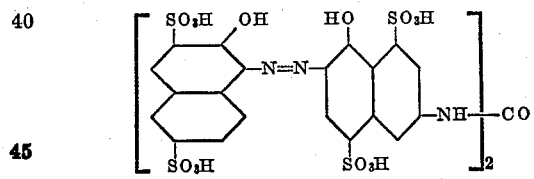

8. The copper complex of the azo dyestuff corresponding to the formula

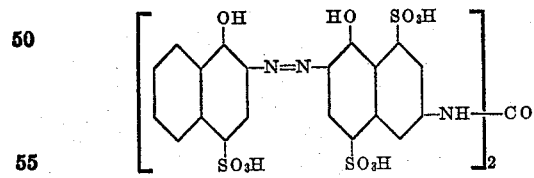

9. The copper complex of the azo dyestuff corresponding to the formula

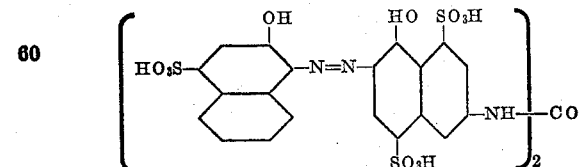

10. The copper complex of the azo dyestuff corresponding to the formula

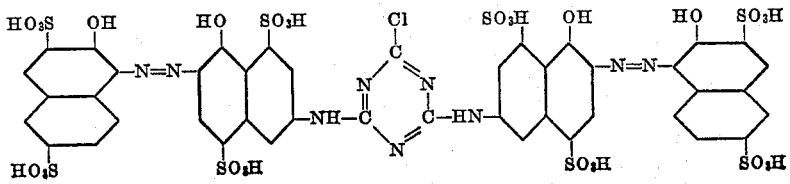

11. The copper complex of the azo dyestuff corresponding to the formula
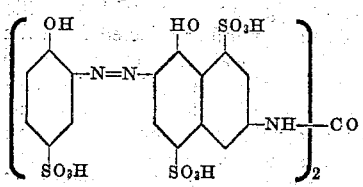
References Cited in the file of this patent
UNITED STATES PATENTS
| | | |
|---|---|---|
| 675,629 | Israel et al. | June 4, 1901 |
| 1,032,797 | Zart | July 16, 1912 |
| 1,746,651 | Hentrich et al. | Feb. 11, 1930 |
| 1,779,298 | Straub et al. | Oct. 21, 1930 |
| 2,235,478 | Friedheim | Mar. 18, 1941 |
| 2,539,178 | Bestehorn | Jan. 23, 1951 |